United States Patent [19]

Okazaki et al.

[11] Patent Number: 4,893,888
[45] Date of Patent: Jan. 16, 1990

[54] OPTICAL WAVELENGTH CONVERTER DEVICE

[75] Inventors: Yoji Okazaki; Koji Kamiyama; Masaki Okazaki, all of Kanagawa, Japan

[73] Assignee: Fuji Photo Film Co., Ltd., Kanagawa, Japan

[21] Appl. No.: 221,972

[22] Filed: Jul. 20, 1988

[30] Foreign Application Priority Data

Jul. 20, 1987 [JP] Japan .......................... 62-180775
Jul. 19, 1988 [JP] Japan .......................... 62-179644

[51] Int. Cl.$^4$ .......................... G02B 6/10; H03F 7/00
[52] U.S. Cl. .......................... 350/96.12; 307/425; 350/96.11; 350/96.30
[58] Field of Search .......................... 307/425; 350/96.11, 350/96.14, 96.30

[56] References Cited

U.S. PATENT DOCUMENTS

| 4,346,314 | 8/1982 | Craxton | 307/425 |
| 4,557,551 | 12/1985 | Dyott | 350/96.30 |
| 4,583,817 | 4/1986 | Papuchon | 350/96.12 |
| 4,766,171 | 8/1988 | DeMartino | 307/425 |
| 4,775,590 | 10/1988 | Sakagami et al. | 350/96.30 |

*Primary Examiner*—William L. Sikes
*Assistant Examiner*—Georgia Y. Epps
*Attorney, Agent, or Firm*—Sughrue, Mion, Zinn, Macpeak & Seas

[57] ABSTRACT

An optical wavelength converter device has a waveguide of a nonlinear optical material disposed in cladding and having a refractive index lower than the refractive index of the cladding for converting a fundamental guided through the waveguide into a second or third harmonic and radiating the second or third harmonic into the cladding. The nonlinear optical material comprises an organic nonlinear optical material having a maximum light absorption coefficient at a wavelength close to the wavelength of at least one of the fundamental and the second harmonic.

7 Claims, 6 Drawing Sheets

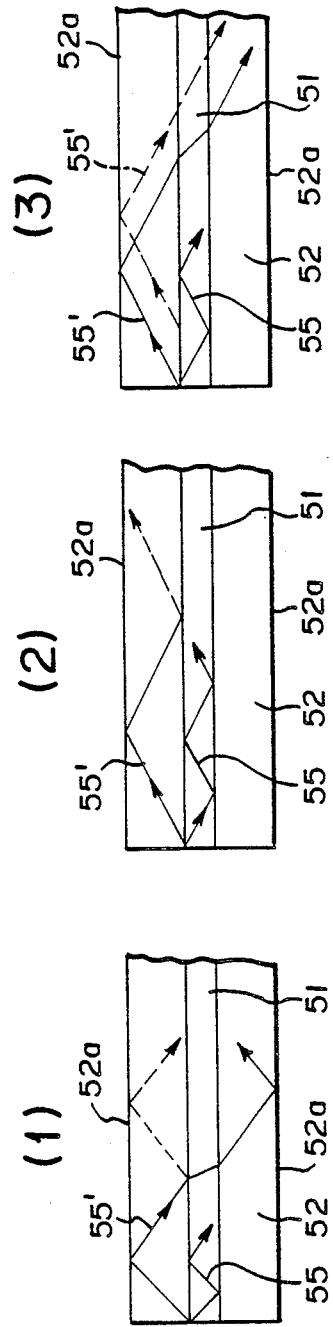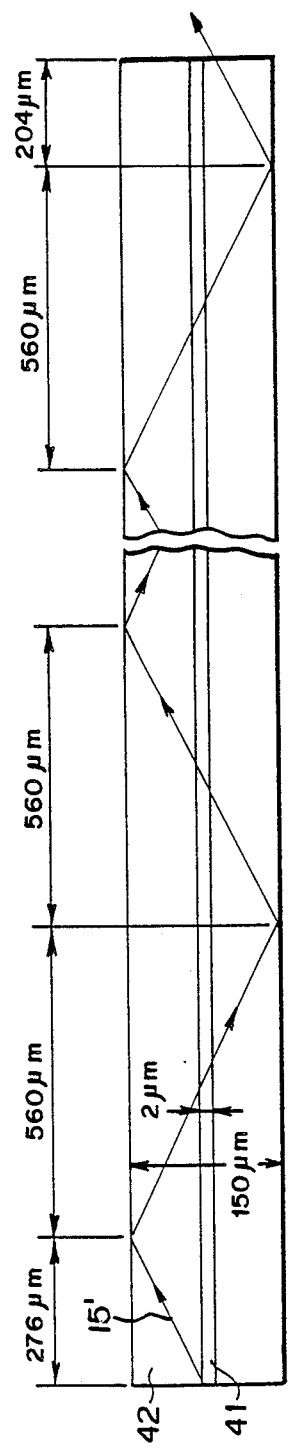

OPTICAL WAVELENGTH CONVERTER DEVICE

BACKGROUND OF THE INVENTION

1. Field of the Invention

The present invention relates to an optical wavelength converter device for converting a fundamental to a second harmonic having a wavelength which is ½ of the wavelength of the fundamental or to a third harmonic having a wavelength which is ⅓ of the wavelength of the fundamental, or to an optical wavelength converter device for converting two fundamentals of different wavelength to two kinds of light each having an angular frequency equivalent to the sum or difference of the angular frequencies of the two fundamentals, and more particularly to an optical wavelength converter device employing an organic nonlinear optical material for obtaining high wavelength conversion efficiency through a resonant effect.

2. Description of the Prior Art

Various attempts have heretofore been made for converting the wavelength of a laser beam into a shorter wavelength based on the generation of a second harmonic by a nonlinear optical material. One example of an optical wavelength converter device for effecting such laser wavelength conversion is a bulk crystal type converter device as disclosed, for example, in "Introduction to Optical Electronics" written by A. Yariv and translated by Kunio Tada and Takeshi Kamiya (published by Maruzen K. K.), pages 200–204. This optical wavelength converter device relies upon the birefringence of a crystal in order to meet phase matching conditions. Therefore, any material which does not exhibit birefringence or exhibits only small birefringence cannot be employed even if it has high nonlinearity.

A fiber type optical wavelength converter device has been proposed to solve the above problem. The optical wavelength converter device of this type is in the form of an optical fiber comprising a core made of nonlinear optical material surrounded by cladding. One example of such an optical fiber is shown in the bulletin Vol. 3, No. 2, of the microoptics research group of a gathering of the applied physics society, pages 28–32. Recently, many efforts are directed to the study of a fiber type optical wavelength converter device since it can easily gain matching between a fundamental and a second harmonic. Another known optical wavelength converter device includes a two-dimensional optical waveguide made of a nonlinear optical material disposed between two substrates serving as cladding, as disclosed in Japanese patent application Nos. 61-159292 and 61-159293 filed by the present applicant. There is also known an optical wavelength converter device comprising a three-dimensional optical waveguide of a nonlinear optical material embedded in a glass substrate for radiating a second harmonic into the glass substrates. These optical wavelength converter devices with the optical waveguide offer the same advantage as that of the fiber type optical wavelength converter device.

Further, it is described in detail in copending Jap. patent application No. 63(1988)-72752 that the fiber type optical wavelength converter device generates a sum-frequency wave and a difference-frequency wave as well. The generator of the sum-frequency wave and the difference-frequency wave in a waveguide type optical wavelength converter device is disclosed in copending Japanese patent application No. 63(1988)-72753. It is also possible to generate a third harmonic by use of 3-dimensional non-linearity of the optical material.

Attention has recently been directed in the art to an organic nonlinear optical material which can produce a second harmonic through a resonant effect, as disclosed, for example, in "Organic nonlinear optical materials" supervised by Masao Kato and Hachiro Nakanishi (published by C.M.C. Co. in 1985). The principles of the generation of a second harmonic through the resonant effect will briefly be described below. As is well known, assuming that the frequencies of a fundamental and a second harmonic are indicated by $\omega_0$, $2\omega_0$, and the frequency of light absorbed by a nonlinear optical material is $\omega$, a nonlinearity constant d is given as follows:

$$d = A \frac{b}{\{\omega^1 - (2\omega_0)^2\}(\omega^1 - \omega_0^1)}$$

where A and B are constants. Therefore, if the optical wavelength λmax at which the light absorption coefficient is maximum is close to at least one of the fundamental wavelength and the second harmonic wavelength, then a resonant effect is produced to greatly increase the nonlinearity constant d.

By employing an organic nonlinear optical material which can generate a second harmonic through such a resonant effect, it is possible to gain wavelength conversion efficiency which is higher, by two digits or more, than possible if a second harmonic would be generated without any resonant effect.

Similarly, in the generation of the sum- or difference-wavelength wave and in the generation of the third harmonic, a similar phenomenon is expected. For example, in case of the generation of the sum- or difference-frequency wave, the non-linearity constant d would be $$d = A \frac{B\omega\{\omega + (\omega_1\omega_2 - \omega_3^2)/3\}}{(\omega^2 - \omega_1^2)(\omega^2 - \omega_2^2)(\omega^2 - \omega_3^2)}$$

[$A, B$: constant, $\omega_3 = \omega_1 + \omega_2$]

where $\omega_1$, $\omega_2$ and $\omega_3$ are frequencies of the two fundamentals and the sum-frequency wave, respectively, and $\omega$ is the frequency of light absorbed by a non-linear optical material. Therefore, if the optical wavelength λ max at which the light absorption is maximum is close to at least one of the wavelength of the two fundamentals and the sum- or difference-frequency wave, a resonant effect is produced to greatly increase the non-linearity constant d.

Thus, in case of the sum- or difference-frequency wave and the third harmonic also, it is possible to gain wavelength conversion efficiency which is higher, by two digits or more, than possible if the wavelength is converted without any resonant effect.

The phenomenon described above has only been confirmed on a thin-film organic nonlinear optical material. Any actual optical wavelength converter device capable of converting optical wavelengths highly efficiently by utilizing the resonant effect is not available so far. The reasons for this in case of the conversion of a fundamental to a second harmonic are as follows:

In order to produce a resonant effect, as described above, an organic nonlinear optical material which can well absorb light having a wavelength close to that of a fundamental or a second harmonic is employed. Where an organic nonlinear optical material in the form of powder or a bulk crystal, for example, which can well absorb light having a wavelength close to that of a second harmonic is employed, since the second harmonic that has been converted in wavelength highly efficiently is absorbed by the organic nonlinear optical material itself, the amount of light of the second harmonic which can actually be extracted from the optical wavelength converter device for use is highly limited. For quite the same reason, in case of the generation of the sum- or difference-frequency or the third harmonic also, there have not been provided a device which is capable of converting a wavelength with high efficiency.

SUMMARY OF THE INVENTION

In view of the aforesaid drawbacks of the conventional optical wavelength converter devices, it is an object of the present invention an optical wavelength converter device capable of actually extracting a large amount of light of a wavelength converted wave such as a second harmonic, sum- or difference-frequency wave and a third harmonic through a resonant effect.

According to the present invention, an optical wavelength converter device of the optical fiber type or the optical waveguide type is constructed as a Cherenkov radiation device in which phase matching is gained between a guided mode in which a fundamental is guided through a core (or an optical waveguide in the optical waveguide type device) and a radiation mode in which a harmonic such as a second harmonic and a third harmonic is radiated into cladding or between a nonlinear polarized wave made by a guided mode of two fundamentals having different wavelengths and a radiation mode in which a sum- or difference-frequency wave is radiated into cladding. The core is made of an organic nonlinear optical material which produces the resonant effect, referred to above, and has a maximum light absorption coefficient at a wavelength close to the wavelength of at least one of the fundamental and the wavelength converted wave.

In another optical wavelength converter device according to the present invention, the core is made of the above organic nonlinear optical material, and the cladding has a thickness of at least 250 $\mu$m from an outer surface thereof to the waveguide.

In still another optical wavelength converter device according to the present invention, the core is made of the above organic nonlinear optical material, and the cladding has a thickness which is greater than $(L \cdot \tan\theta)/2$ where $\theta$ is the phase matching angle of the wavelength converted wave, and L is the length of the optical wavelength converter device.

In yet another optical wavelength converter device according to the present invention, the core is made of the above organic nonlinear optical material, and the cladding has a thickness which is greater than $L \cdot \tan\theta$ where $\theta$ is the phase matching angle of the wavelength converted wave, and L is that length of the optical wavelength converter device.

Now in case of converting a fundamental to a second harmonic, in the optical wavelength converter device of the Cherenkov radiation type, the second harmonic is radiated into the cladding, or is radiated into the cladding and then guided therethrough while being subjected to repeated total reflection therein. Therefore, the second harmonic which is generated by the organic nonlinear optical material with the resonant effect never reenters the core or reenters the core with very small probability. As a consequence, the second harmonic which has been converted in wavelength highly efficiently by the resonant effect is less absorbed by the organic nonlinear optical material of the core, and a large amount of light of the second harmonic can be extracted from the device.

By selecting the thickness of the cladding to be 250 $\mu$m or larger, or $(L \cdot \tan\theta)/2$ or more, it is much less probable that the second harmonic is absorbed by the core, and it is possible to extract a larger amount of light of the second harmonic. This will be explained in greater detail below with respect to a conventional fiber type optical wavelength converter device.

In a conventional fiber type optical wavelength converter device, the diameter of the cladding is usually about 100 $\mu$m, about 250 $\mu$m at maximum, and the diameter of the core is in the range of from about 1 to 10 $\mu$m. In terms of the cladding thickness referred to above, the cladding has a thickness of about 120 $\mu$m. In the optical wavelength converter device of this type, the longer the device, the greater the wavelength conversion efficiency. The length of the device should be 30 mm or more as a practical matter. If the optical wavelength converter device having these numerical values for the cladding diameter, the core diameter, and the device length, the second harmonic radiated from the core into the cladding undergoes total reflection repeatedly by the outer surface of the cladding tens of times at maximum. Therefore, the number of times at which the second harmonic enters the core is increased, and the second harmonic is more absorbed by the core.

By selecting the thickness of the cladding to be 250 $\mu$m or more (i.e., increasing the cladding diameter so that it is approximately 500 $\mu$m or more), the number of times at which total reflection of the second harmonic is caused by the outer surface of the cladding is reduced to half or a fraction of the number of times experienced by the conventional fiber type optical wavelength converter device. As a consequence, absorption of the second harmonic by the core is effectively prevented.

For more reliable prevention of absorption of the second harmonic by the core, the optical wavelength converter device should be constructed so as to entirely prevent the second harmonic from reentering the core, by selecting the thickness of the cladding to be $(L \cdot \tan\theta)/2$ or more.

With the cladding thickness thus selected, absorption of the second harmonic by the core is reduced, and additionally phase disturbance of the second harmonic is lowered, a condition which contributes to an increase in the wavelength conversion efficiency. This reduction in the phase disturbance of the second harmonic will be described in detail below.

The phase disturbance of the second harmonic is caused as follows:

(1) As shown in FIG. 6(1), a second harmonic 55' progressing toward an end surface of the device while being subjected to total reflection between outer surfaces 52a of cladding 52 undergoes Fresnel reflection as indicated by the broken line due to the difference between the refractive indexes (with respect to the second harmonic) of the cladding 52 and a core 51. Therefore, there is a phase shift between the second harmonic 55' that has passed through the core 51 and the second harmonic 55' subjected to Fresnel reflection.

(2) Where the refractive index of the cladding 52 with respect to the second harmonic is greater than the refractive index of the core 51 with respect to the second harmonic, there is developed total reflection between boundaries between the core 51 and the cladding 52 as indicated by the broken line in FIG. 6(2), resulting phase disturbance.

(3) If the core 51 is displaced off center with respect to the cladding 52, then one second harmonic 55' passes through the core 51 and another second harmonic 55' does not, as indicated by the solid and broken lines in FIG. 6(3), thus developing a phase shift between these second harmonics 55'.

The phenomena developed under the conditions described in (1), (2), and (3) above can be eliminated to effectively prevent the phase disturbance or shift of the second harmonic by selecting the cladding thickness to be 250 $\mu$m or more, or $(L \cdot \tan\theta)/2$ or more for thereby reducing the number of times the second harmonic undergoes total reflection by the outer surface of the cladding, and the number of times the second harmonic reenters the core, or eliminating reentry of the second harmonic into the core.

Where the thickness of the cladding is increased to a value of $L \cdot \tan\theta$ or greater, the second harmonic is prevented from reentering the core, and the second harmonic that is matched in phase is free from total reflection by the outer surface of the cladding. Consequently, there is no phase shift between a second harmonic emitted from the end surface of the cladding after being subjected to total reflection by the outer surface of the cladding and a second harmonic which is directly emitted from the end surface of the cladding without being subjected to total reflection. As a result, any reduction in the wavelength conversion efficiency and difficulty in collecting the second harmonics, which would otherwise be caused by such a phase shift or difference, are prevented.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 6(1), 6(2), and 6(3) are views explaining the cause of a phase disturbance of a second harmonic in a conventional fiber-type optical wavelength converter device;

FIG. 8 is a schematic view explaining an optical path of a second harmonic in a conventional fiber-type optical wavelength converter device;

DESCRIPTION OF THE PREFERRED EMBODIMENTS

1st Embodiment

Figure 1:
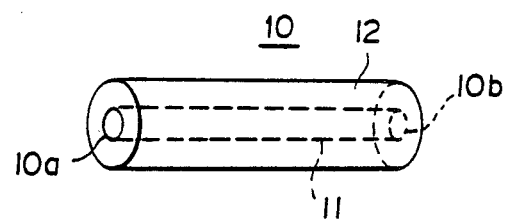
FIG. 1 is a perspective view of an optical wavelength converter device according to a first embodiment of the present invention.
Figure 2:
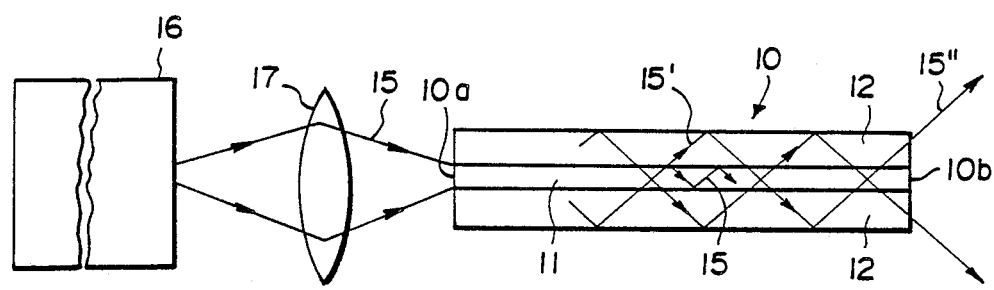
FIG. 2 is a schematic side elevational view of the optical wavelength converter device shown in FIG. 1.

FIGS. 1 and 2 show an optical wavelength converter device 10 according to a first embodiment of the present invention. The optical wavelength converter device 10 comprises an optical fiber including a core 11 made of an organic nonlinear optical material filled in a hollow space defined centrally in cladding 12. In the illustrated embodiment, the organic nonlinear optical material is 4-dimethylaminobenzaldehyde 4'-nitrophenylhydrazone represented by the following structural formula:

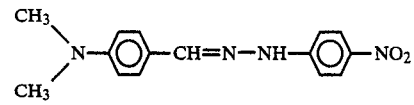

The optical wavelength converter device 10 of this embodiment serves to convert a fundamental having a wavelength of 840 nm to a second harmonic having a wavelength of 420 nm. The wavelength $\lambda$max at which the light absorption coefficient of 4-dimethylaminobenzaldehyde 4'-nitrophenylhydrazone is 428 nm, which is of a value very close to the wavelength of the second harmonic.

Figure 3:
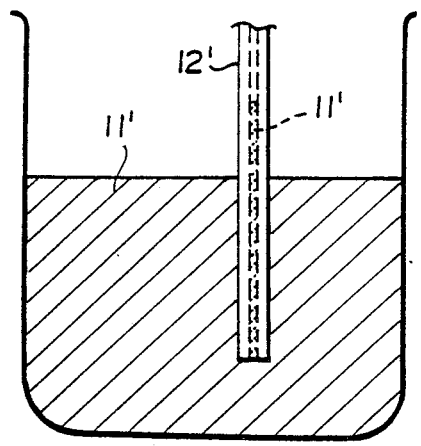
FIG. 3 is a schematic view showing a process of manufacturing the optical wavelength converter device shown in FIG. 1.

A process of manufacturing the optical wavelength converter device 10 will be described below. A hollow glass fiber 12' (FIG. 3) which will serve as the cladding 12 is provided, the hollow glass fiber 12' having an outside diameter of about 100 $\mu$m and the hollow space therein having a diameter ranging from 1 to 10 $\mu$m. As shown in FIG. 3, 4-dimethylaminobenzaldehyde 4'-nitrophenylhydrazone is kept as a molten solution 11' in a furnace, and one end of the glass fiber 12' is immersed in the molten solution 11'. Then, the molten solution 11' of 4-dimethylaminobenzaldehyde 4'-nitrophenylhydrazone enters the hollow space in the glass fiber 12' due to capillarity. The molten solution 11' is kept at a temperature slightly higher than the melting point (182° C.) of 4-dimethylaminobenzaldehyde 4'-nitrophenylhydrazone in order to prevent this material from being decomposed. Thereafter, the glass fiber 12' is quickly cooled to cause the 4-dimethylaminobenzaldehyde 4'-nitrophenylhydrazone in the hollow space to be polycrystallized.

More preferably, the optical fiber 12' is gradually pulled from the furnace which is kept at the temperature higher than the melting point of 4-dimethylaminobenzaldehyde 4'-nitrophenylhydrazone into an outer space which is kept at a temperature lower than that melting point, for thereby causing 4-dimethylaminobenzaldehyde 4'-nitrophenylhydrazone in the molten state to be monocrystallized continuously at the point where it is withdrawn from the furnace. The core 11 thus prepared is of highly long monocrystalline form with a uniform crystal orientation. Since the wavelength conversion efficiency of the optical wavelength converter device of this type is proportional to the length of the device, as is well known in the art, the longer the optical wavelength converter device, the greater the practical value of the device.

After the core 11 is filled in the glass fiber 12', the opposite ends of the glass fiber 12' are suitably cut off to complete the optical wavelength converter device 10. The optical wavelength converter device 10 will be used as shown in FIG. 2. A fundamental 15 enters the core 11 from an entrance end surface 10a of the device 10. The fundamental 15 is generated by a semiconductor laser 16, for example. More specifically, a laser beam (fundamental) 15 of a wavelength of 840 nm emitted from the semiconductor laser 16 is converged by an objective lens 17 and applied to the end surface 10a at the core 11 so as to enter the optical wavelength converter device 10. The fundamental 15 is then converted to a second harmonic 15' having a wavelength (420 nm) which is ½ of that of the fundamental 15, by 4-dimethylaminobenzaldehyde 4'-nitrophenylhydrazone which the core 11 is made of. The second harmonic 15' progresses through the device 10 while repeating total reflection between outer surfaces of the cladding 12, for achieving phase matching between a guided mode in which the fundamental 15 is guided through the core 11 and a radiation mode in which the second harmonic 15' is radiated into the cladding 12 (so-called "Cherenkov radiation").

A beam 15'' which is a mixture of the second harmonic 15' and the fundamental 15 is emitted from an exit end surface 10b of the optical wavelength converter device 10. The emitted beam 15'' is passed through a filter, for example, which absorbs the fundamental 15 almost in its entirety and allows the second harmonic 15' to pass therethrough. Therefore, only the second harmonic 15' is extracted for use.

As described above, the wavelength λmax at which the light absorption coefficient of 4-dimethylaminobenzaldehyde 4'-nitrophenylhydrazone is 428 nm, which is very close to the wavelength of the second harmonic. Therefore, a resonant effect is produced for wavelength conversion at high efficiency. Since the second harmonic 15' is guided through the cladding 12, it is unlikely for the second harmonic 15' to reenter the core 11 which is of a diameter that is 1/10 to 1/100 of the diameter of the cladding 12. Therefore, no substantial portion of the second harmonic 15' will be absorbed by the core 11. With the absorption of the second harmonic 15' by the core 11 being thus prevented, a large amount of light of the second harmonic 15' can be extracted from the device 10.

In order to confirm the resonant effect, a fundamental having a wavelength of 1064 nm generated by a YAG laser was applied to the optical wavelength converter device 10. The wavelength of a second harmonic to be extracted was 532 nm, and the difference between this wavelength and the wavelength λmax=428 nm was larger than the difference between the wavelength of 420 nm of the second harmonic in the above embodiment and the wavelength λmax=428 nm. The wavelength=1064 nm of the fundamental was much more remote from the wavelength λmax. In this example, therefore, the wavelengths of the fundamental and the second harmonic were remote from the wavelength λmax as with the conventional device for preventing absorption of the fundamental and the second harmonic.

According to this example, the wavelength conversion efficiency was about 1/10 of that in the previous embodiment. Stated otherwise, the optical wavelength converter device of the aforesaid embodiment has a wavelength conversion efficiency which is about 10 times that of the conventional optical wavelength converter devices which do not rely upon the resonant effect.

Other organic nonlinear optical materials having a maximum light absorption coefficient at a wavelength λmax close to the wavelength=420 nm of the second harmonic 15' include 4-chlorobenzaldehyde 4'-nitrophenylhydrazone with λmax=398 nm represented by the following structural formula:

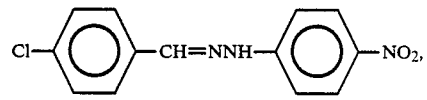

1-methyl-4[2-(4-dimethylaminophenyl)ethenyl] pyridinium methylsulfate with λmax=473 nm represented by by following structural formula:

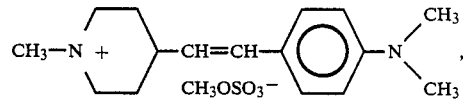

or the like. The core 11 may be made of any of these materials.

In the above embodiment, the optical wavelength converter device is constructed as a fiber-type converter device. However, the optical wavelength converter device of the invention may be constructed as an optical waveguide converter device (also based on the Cherenkov radiation).

2nd Embodiment

Figure 4:
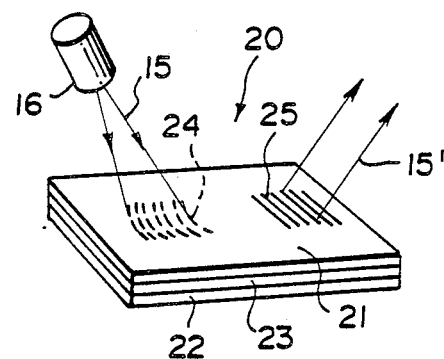
FIGS. 4 and 5 are perspective views of optical wavelength converter devices according to second and third embodiments, respectively, of the present invention.

FIG. 4 shows an optical wavelength converter device 20 according to a second embodiment of the present invention, constructed as a two-dimensional optical waveguide converter device. The optical wavelength converter device 20 comprises a pair of confronting space glass substrates 21, 22 and a slab-like two-dimensional optical waveguide 23 made of an organic nonlinear optical material disposed between the glass substrates 21, 22. The glass substrates 21, 22 have a refractive index lower than that of the organic nonlinear optical material. A focusing grating coupler 24 for receiving a fundamental is disposed on the surface of the optical waveguide 23 which is held in contact with the upper (as shown) glass substrate 21 near one end of the device 20. A linear grating coupler 25 for emitting a second harmonic is disposed on the same surface of the upper glass substrate 21 near the other end of the device 20.

A laser beam 15 emitted as a fundamental from the semiconductor laser 16 is applied to the focusing grating coupler 24, is diffracted thereby, and enters the optical waveguide 23. The fundamental 15 is converted into a second harmonic 15' having a wavelength which is ½ of that of the fundamental 15 by the organic nonlinear optical material which the optical waveguide 23 is made of. The second harmonic 15' progresses in the device 20 while repeating total reflection between outer surfaces of the substrates 21, 22, for achieving phase matching between a guided mode in which the fundamental 15 is guided through the optical waveguide 23 and a radiation mode in which the second harmonic 15' is radiated into the glass substrates 21, 22. The second harmonic 15' is then diffracted by the linear grating coupling 25 and emitted from the device 20.

The organic nonlinear optical material of the optical waveguide 23 has its maximum light absorption coefficient at a wavelength λmax close to the wavelength of at least one of the fundamental 15 and the second harmonic 15'. The glass substrates 21, 22 have sufficient thicknesses to make less frequent for the second harmonic 15' to pass through the optical waveguide 23. With this arrangement, high wavelength conversion efficiency can be achieved by relying upon the resonant effect.

3rd Embodiment

Figure 5:
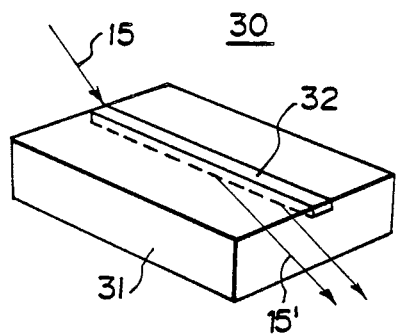

FIG. 5 illustrates an optical wavelength converter device 30 according to a third embodiment of the present invention, constructed as a three-dimensional optical waveguide converter device. The optical wavelength converter device 30 comprises a glass substrate 31 with a three-dimensional waveguide 32 embedded in one surface thereof. The optical waveguide 32 is made of an organic nonlinear optical material having its maximum light absorption coefficient at a wavelength λmax close to the wavelength of at least one of the fundamental 15 and the second harmonic 15'.

In the optical wavelength converter device 30 with the embedded three-dimensional optical waveguide 32, the second harmonic 15' generated by the organic nonlinear optical material of the optical waveguide 32 does hardly reenter the optical waveguide 32. Therefore, the second harmonic 15' is not absorbed by the nonlinear optical material, so that high waveguide conversion efficiency can be accomplished by utilizing the resonant effect.

4th Embodiment

Figure 7:
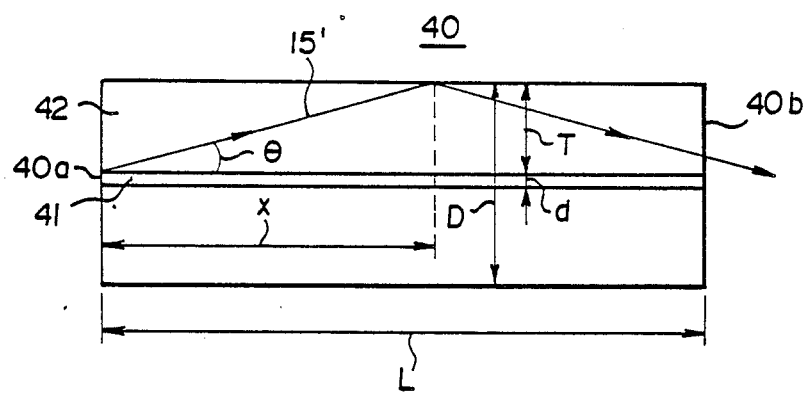
FIG. 7 is a schematic side elevational view of an optical wavelength converter device according to a fourth embodiment of the present invention.

An optical wavelength converter device 40 according to a fourth embodiment of the present invention is shown in FIG. 7. The optical wavelength converter device 40 is constructed as a fiber-type converter device. The optical wavelength converter device 40 comprises a core 41 made of 3,5-dimethyl-1-(4-nitrophenyl)-pyrazole hereinafter referred to as "PRA") disclosed in Japanese patent application No. 61-53884 filed by the present applicant, and cladding 42 made of SFS3 glass. The optical wavelength converter device 40 is manufactured, and the fundamental 15 is applied thereto, in the same manner as described above with reference to the first embodiment.

The light transmittance of PRA which the core 41 is made of is lowest with respect to light having a wavelength slightly lower than the wavelength of 380 nm (stated otherwise, the light absorption coefficient of PRA is highest with respect to light of that wavelength). In this fourth embodiment, light having a wavelength of 780 nm is applied as the fundamental 15 to extract a second harmonic 15' having a wavelength of 390 nm. Since the wavelength λmax at which the light absorption coefficient of PRA is maximum is very close to the wavelength of the second harmonic 15', the aforesaid resonant effect is produced and wavelength conversion is carried out at high efficiency.

The diameter D of the cladding 42 is 3 mm, the diameter d of the core 31 is 2 μm (i.e., the thickness T of the cladding 42 is 1499 μm, which is far larger than 250 μm), and the length L of the device 40 is 10 mm. The phase matching angle θ at which the second harmonic 15' is radiated into the cladding 42 is about 15°. Based on these numerical values, the second harmonic 15' that travels along the longest path within the device 10 and can be matched in phase, as shown in FIG. 7 (i.e., the second harmonic 15' which is produced most closely to the entrance end surface 40a of the device 40 at the outermost peripheral portion of the core 41) will be analyzed below. The distance x which this second harmonic 15' traverses in the longitudinal direction of the device 10 until it reaches the outer peripheral surface of the cladding 42 is given by:

$$x = (D - d)/(2\tan\theta)$$
$$= (3000 - 2)/(2\tan 15°)$$
$$= 5593 \ \mu m$$

In order for the second harmonic 15' to reenter the core 41 by total reflection from the outer surface of the cladding 42, it is necessary that the length of the optical wavelength converter device 40 be:

$$2x = 11186 \ \mu m = 11.19 \ mm$$

Inasmuch as the length L of the optical wavelength converter device 40 of this embodiment is 10 mm, however, the above second harmonic 15' does not actually reenter the core 41. Because the second harmonic 15' analyzed above traverses the longest path in the device 10, all of the second harmonic 15' radiated into the cladding 42 at the phase matching angle θ does not reenter the core 41. Consequently, any phase disturbance and absorption of the second harmonic by the core, which would otherwise occur if the second harmonic reentered the core, are not brought about.

In the absence of absorption of the second harmonic 15' by the core and phase disturbance, highly intensive light of the second harmonic can be extracted from the optical wavelength converter device 40, and wavelength conversion efficiency is high.

Figure 11:
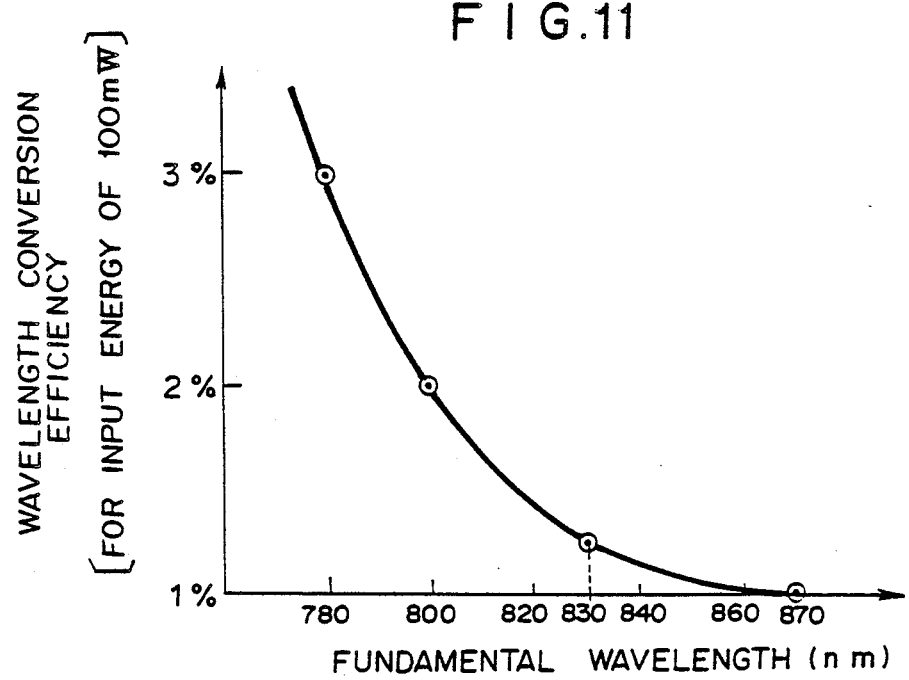
FIG. 11 is a graph showing the wavelength conversion efficiency of an optical wavelength conversion device according to the present invention.

FIG. 11 shows wavelength conversion efficiencies achieved when lights having wavelengths of 780, 800, 830, and 870 nm are applied as fundamentals to the optical wavelength converter device 40, and lights having wavelengths of 390, 400, 415, and 435 nm are extracted from the device 40. A study of FIG. 11 shows that as the wavelength of the second harmonic becomes more remote from the wavelength at which the light absorption coeffiecient of PRA is maximum, the wavelength conversion efficiency becomes lower and so does the resonant effect.

An optical wavelength converter device according to a comparative example was prepared in which the diameter D of the cladding 150 μm and the other dimensions are the same as those of the above embodiment, and the wavelength conversion efficiency of this optical wavelength converter device was checked when converting a fundamental having a wavelength of 780 nm into a second harmonic. The wavelength conversion efficiency was about 3% for the input energy of 100 mW. In the optical wavelength converter device according to the comparative example, the second harmonic 15' along the longest path travels 276 μm (=74/tan15°) in the longitudinal direction of the device until it first reaches the outer surface of the cladding 42, and travels 560 nm (=150/tan15°) in the longitudinal direction of the device in one cycle of total reflection by the outer surface of the cladding. Therefore, if the length of the device is 10 mm (=10000 μm), the second harmonic 15' reenters the core 41 seventeen times since $$10000 = 560 \times 17 + 276 + 204.$$

As is apparent from the foregoing description with reference to FIG. 7, all of the second harmonic that can be matched in phase does not reenter the core if the following relationship is met:

$$\frac{D-d}{2} > \frac{L}{2} \tan\theta$$

where D is the diameter of the cladding, d is the diameter of the core, L is the length of the device, and $\theta$ is the phase matching angle, i.e., the thickness of the cladding $T=(D-d)/2$ meets:

$$T > (L \cdot \tan\theta)/2,$$

a condition which is very preferable.

5th Embodiment

More preferably, the thickness T of the cladding is sufficiently increased to satisfy:

$$T > L \cdot \tan\theta$$

Figure 9:
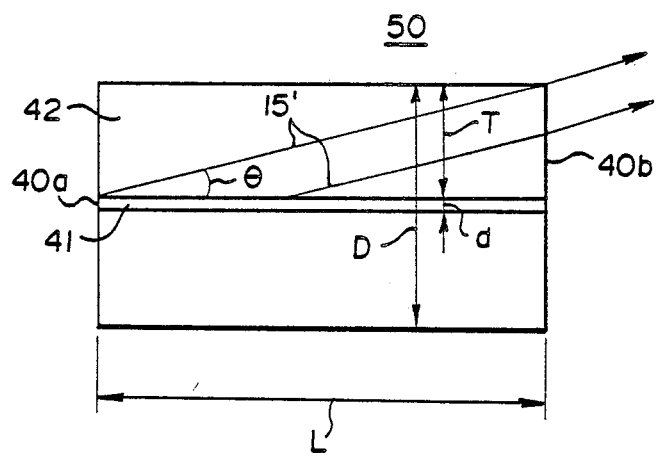
FIG. 9 is a schematic side elevational view of an optical wavelength converter device according to a fifth embodiment of the present invention.
Figure 10:
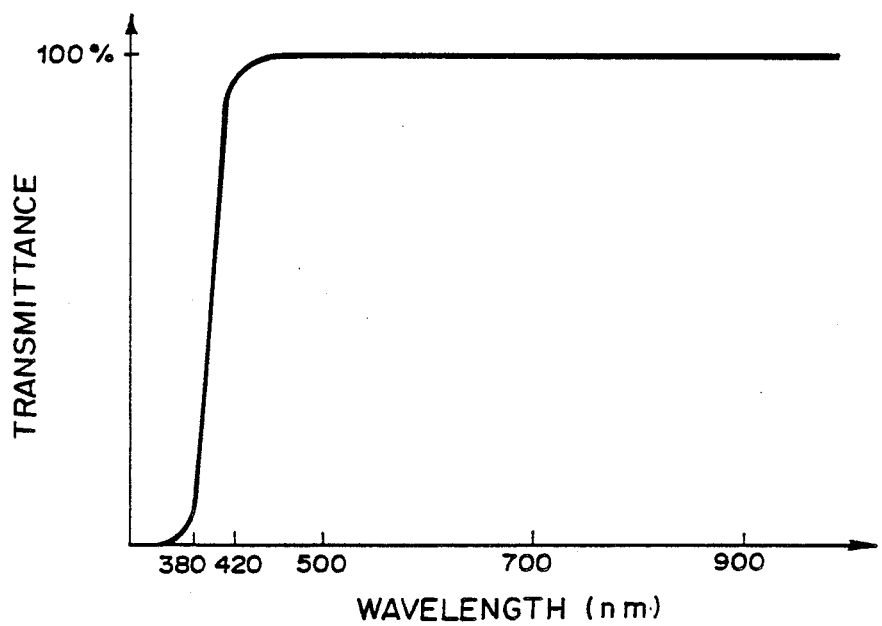
FIG. 10 is a graph illustrating the light transmittance characteristics of PRA employed in the present invention.

FIG. 9 shows an optical wavelength converter device 50 having such cladding thickness according to a fifth embodiment of the present invention. As illustrated in FIG. 9, all of second harmonic 15' that can be matched in phase does not reenter the core 41, but never undergoes total reflection by the outer surface of the cladding 42. In the illustrated arrangement, no phase difference is produced between a second harmonic 15' reflected by the outer surface of the cladding 42 through total reflection and emitted from the exit end surface 40b of the device and a second harmonic 15' emitted directly from the exit end surface 40b without total reflection. Therefore, any reduction in the wavelength conversion efficiency due to interference of the second harmonic, and difficulty in collecting the second harmonic, which would otherwise result from a phase difference, are eliminated, so that a highly intensive light spot of the second harmonic can be obtained.

Rather than satisfying the above condition, the thickness of the cladding $T=(D-d)/2$ may be selected to be 250 μm or higher greatly reduce the number of times at which the second harmonic reenters the core as compared with the conventional fiber-type optical wavelength converter device. This also prevents any phase disturbance of the second harmonic effectively.

If any absorption of the second harmonic by the core is small or if no second harmonic is absorbed by the core, then a second harmonic of a shorter wavelength which can more easily be absorbed by the core can be extracted with high intensity.

Figure 12:
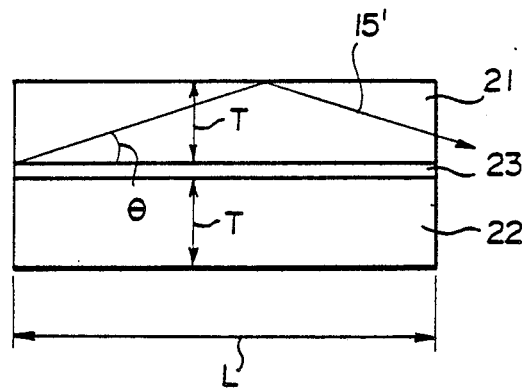
FIGS. 12 and 13 are schematic views explaining the thickness of the cladding, the length of the device, and the phase matching angle in the optical wavelength converter devices shown in FIGS. 4 and 5, respectively.
Figure 13:
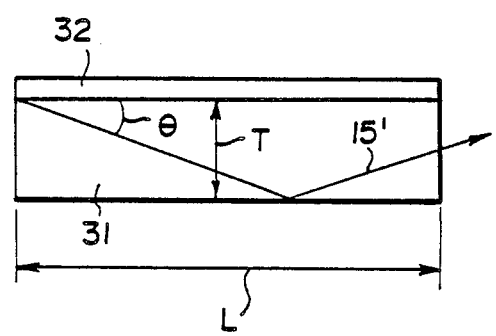

In the above fiber-type optical wavelength wavelength converter device, the number of times at which the second harmonic 15' enters the core is reduced, or the reentry of the second harmonic 15' into the core is eliminated, and total reflection of the second harmonic by the outer surface of the cladding is eliminated. These effects can also be achieved by selecting the thickness of the cladding in the optical wavelength converter devices with the optical waveguides as shown in FIGS. 4 and 5 to gain high wavelength conversion efficiency in combination with the resonant effect. More specifically, the thicknesses T of the glass substrates 21, 22 of the optical wavelength converter device shown in FIG. 4 are selected to be 250 μm or greater as shown in FIG. 12, and the thickness T of the glass substrate 31 of the optical wavelength converter device illustrated in FIG. 5 is selected to be 250 μm or greater as shown in FIG. 13, for greatly reducing the number of times at which the second harmonic 15' reenters the optical waveguide 23 or 32. If the thickness T is selected to meet $T > (L \cdot \tan\theta)/2$, then such reentry is completely eliminated. If $T > L \cdot \tan\theta$, then any total reflection of the second harmonic 15' by the outer surface of the glass substrate 21, 22 or 31 is fully eliminated. The foregoing holds true with the optical wavelength converter device of the type shown in FIG. 4 if the entire length of the device is effectively utilized for optical wavelength conversion, i.e., if the fundamental enters the device from an end surface and the second harmonic is extracted from an opposite end surface of the device.

The present invention has hereinabove been described with reference to an example where the fundamental is converted to a second harmonic. In case of generating a sum- or difference-frequency wave, a high efficiency is achieved by using an optical material having absorption at a frequency close to at least one of the frequencies of the two fundamentals and the sum- or difference-frequency wave. In case of converting a fundamental to a third harmonic also, a high efficiency is achieved as well by using an optical material having absorption at a frequency close to at least one of the frequencies of the fundamental and the third harmonic.

With the present invention, as described above, high wavelength conversion efficiency is achieved by relying upon the resonant effect, and in addition absorption of a wavelength converted wave by a nonlinear optical material is reduced or eliminated. Moreover, phase disturbance of the wavelength converted wave is effectively prevented, and a large amount of light of the wavelength converted wave can be extracted from the optical wavelength converter device. Therefore, the optical wavelength converter device according to the present invention has much higher light utilization efficiency than that of the conventional optical wavelength converter devices for generating a wavelength converted wave of high intensity.

Although certain preferred embodiments have been shown and described, it should be understood that many changes and modifications may be made therein without departing from the scope of the appended claims.

We claim:

1. An optical wavelength converter device comprising:
   (i) cladding having a first refractive index; and
   (ii) a waveguide of a nonlinear optical material disposed in said cladding and having a second refractive index lower than said first refractive index, for converting the wavelength of a fundamental guided through said waveguide and radiating the wavelength converted waves into said cladding, said nonlinear optical material comprising an organic nonlinear optical material having a maximum light absorption coefficient at a wavelength close to the wavelength of at least one of said fundamental and said wavelength converted waves.

2. An optical wavelength converter device according to claim 1, wherein said waveguide comprises a core covered with said cladding, whereby said optical wavelength converter device is in the form of an optical fiber type device.

3. An optical wavelength converter device according to claim 1, wherein said cladding comprises a pair of confronting substrates between which said waveguide is disposed as a two-dimensional waveguide, whereby said optical wavelength converter device is in the form of a two-dimensional waveguide type device.

4. An optical wavelength converter device according to claim 1, wherein said cladding comprises a substrate, said waveguide being embedded as a three-dimensional waveguide in said substrate, wherein said optical wavelength converter device is in the form of an embedded three-dimensional waveguide type device.

5. An optical wavelength converter device according to claim 1, 2, 3, or 4, wherein said cladding has a thickness of at least 250 $\mu$m from an outer surface thereof to said waveguide.

6. An optical wavelength converter device according to claim 1, 2, 3, or 4, wherein said cladding has a thickness which is greater than $(L \cdot \tan\theta)/2$ where $\theta$ is the phase matching angle of the wavelength converted waves, and L is the length of the optical wavelength converter device.

7. An optical wavelength converter device according to claim 1, 2, 3, or 4 wherein said cladding has a thickness which is greater than $L \cdot \tan\theta$ where $\theta$ is the phase matching angle of the wavelength converted waves, and L is the length of the optical wavelength converter device.

* * * * *